US010096054B2

(12) United States Patent
Benson et al.

(10) Patent No.: US 10,096,054 B2
(45) Date of Patent: *Oct. 9, 2018

(54) SYSTEM AND METHOD FOR COLLECTING AND ACCESSING PRODUCT INFORMATION IN A DATABASE

(75) Inventors: Amanda Benson, Dalby (SE); Gregory P. Benson, Rancho Santa Fe, CA (US); Melissa Heller, San Diego, CA (US)

(73) Assignee: 1997 Irrevocable Trust for Gregory P. Benson, Rancho Santa Fe, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/685,614

(22) Filed: Jan. 11, 2010

(65) Prior Publication Data
US 2010/0114957 A1 May 6, 2010

Related U.S. Application Data

(63) Continuation of application No. 11/784,497, filed on Apr. 5, 2007, now abandoned.

(60) Provisional application No. 60/789,362, filed on Apr. 5, 2006.

(51) Int. Cl.
*G06F 17/30* (2006.01)
*G06Q 30/06* (2012.01)
*G06Q 10/00* (2012.01)
*G06Q 30/02* (2012.01)

(52) U.S. Cl.
CPC ......... *G06Q 30/0631* (2013.01); *G06Q 10/00* (2013.01); *G06Q 30/0201* (2013.01)

(58) Field of Classification Search
CPC .......... G06F 17/30867; G06Q 30/0631; G06Q 30/0201
See application file for complete search history.

(56) References Cited

U.S. PATENT DOCUMENTS

| 5,754,939 A | 5/1998 | Hertz et al. |
| 5,862,325 A * | 1/1999 | Reed et al. .................. 709/201 |
| 5,930,764 A | 7/1999 | Melchione et al. |
| 5,941,947 A * | 8/1999 | Brown et al. ................ 709/225 |
| 6,317,718 B1 * | 11/2001 | Fano .......................... 705/14.39 |
| 6,334,110 B1 | 12/2001 | Walter et al. |
| 7,054,841 B1 * | 5/2006 | Tenorio ............... G06Q 20/382 705/51 |
| 7,149,744 B1 * | 12/2006 | Tenorio ............ G06F 17/30011 |
| 7,627,401 B2 | 12/2009 | Benson |
| 8,150,857 B2 | 4/2012 | Benson |
| 8,990,590 B2 | 3/2015 | Benson |
| 9,105,060 B2 | 8/2015 | Benson |
| 9,111,279 B2 | 8/2015 | Benson |

(Continued)

FOREIGN PATENT DOCUMENTS

| EP | 1920366 A1 | 5/2008 |
| WO | WO 2007/084793 A2 | 7/2007 |

(Continued)

*Primary Examiner* — Tarek Chbouki
(74) *Attorney, Agent, or Firm* — Knobbe, Martens, Olson & Bear, LLP

(57) ABSTRACT

A database system is disclosed. The database system includes a matching module configured to query a database for users which have data matching an interest of another user and to selectively grant to one or more of the users access to data of the other user based at least in part on a result of the query and on an access control list.

34 Claims, 11 Drawing Sheets

(56) References Cited

U.S. PATENT DOCUMENTS

| | | |
|---|---|---|
| 2001/0032194 A1* | 10/2001 | Kutsuzawa et al. ............ 705/80 |
| 2001/0049653 A1* | 12/2001 | Sheets .............................. 705/38 |
| 2002/0026356 A1 | 2/2002 | Bergh et al. |
| 2002/0095331 A1 | 7/2002 | Osman et al. |
| 2002/0143961 A1* | 10/2002 | Siegel et al. .................. 709/229 |
| 2003/0126146 A1* | 7/2003 | Van Der Riet ............... 707/100 |
| 2003/0154120 A1 | 8/2003 | Freishtat et al. |
| 2004/0064358 A1 | 4/2004 | Hill et al. |
| 2004/0088237 A1* | 5/2004 | Moenickheim ........ G06Q 20/04 705/35 |
| 2004/0098323 A1* | 5/2004 | Bowser ........................... 705/35 |
| 2004/0128194 A1 | 7/2004 | Mase et al. |
| 2004/0158496 A1* | 8/2004 | Tenorio ........................... 705/26 |
| 2005/0038688 A1* | 2/2005 | Collins et al. ..................... 705/9 |
| 2007/0174259 A1* | 7/2007 | Amjadi ............................. 707/3 |
| 2007/0179971 A1 | 8/2007 | Benson |
| 2007/0180262 A1 | 8/2007 | Benson |
| 2007/0204301 A1 | 8/2007 | Benson |
| 2007/0208602 A1* | 9/2007 | Nocera et al. ..................... 705/8 |
| 2007/0260359 A1 | 11/2007 | Benson |
| 2008/0021767 A1 | 1/2008 | Benson |
| 2008/0033951 A1 | 2/2008 | Benson |
| 2010/0114396 A1 | 5/2010 | Benson |
| 2011/0213799 A1 | 9/2011 | Benson |
| 2013/0060613 A1 | 3/2013 | Benson |
| 2014/0304108 A1 | 10/2014 | Benson |

FOREIGN PATENT DOCUMENTS

| | | |
|---|---|---|
| WO | WO 2007/087194 A2 | 8/2007 |
| WO | WO 2007/092503 A2 | 8/2007 |
| WO | WO 2007/117592 A2 | 10/2007 |

* cited by examiner

Sample Personal Product Database

| Personal Profile | | | | | | |
|---|---|---|---|---|---|---|
| | ID nr | 123456 | | | | |
| | Residence | 92067 | | | | |
| | Age | 51 | | | | |
| | Income | 150,000 | | | | |
| | Family members | 5 | | | | |
| | Outstanding debt | 40,000 | | | | |
| | Avg. monthly spending | 8,200 | | | | |
| Wish List | | | | | | |
| | Name | Size | Model | Brand | Occasion | Target |
| | Watch | m | xtra | Rolex | B'day | na |
| | Automobile | na | S500 | Mercedes | Xmas | na |
| Planning to purchase in less than 30 days | | | | | | |
| | Waterheater | large | open | open | na | 400 |
| Planning to purchase within 12 months | | | | | | |
| | Home refinance | 1 million | na | open | | 5% |
| Grocery Purchase History | | | | | | |
| | Item | Store | Size | Price | | |
| | Tissue | Vons | 1000 | 2.35 | | |
| | Bananas | Bananas | 3 lbs | 4.76 | | |
| Gasoline Purchase History | | | | | | |
| | Vendor | Octane | Gallons | Price | Date | |
| | Shell | 95 | 24 | 3.05 | 2/2/2007 | |
| Personal Wardrobe Inventory | | | | | | |
| | Item | Size | Color | Brand | Material | Style |
| | Slacks | 35 | Black | Armani | Wool | Cuff |
| | Shirt | 42 | White | na | Cotton | Button |

FIG. 3

SYSTEM AND METHOD FOR COLLECTING AND ACCESSING PRODUCT INFORMATION IN A DATABASE

CROSS-REFERENCE TO RELATED APPLICATIONS

This application is a continuation of U.S. application Ser. No. 11/784,497, titled "SYSTEM AND METHOD FOR COLLECTING AND MANAGING PRODUCT INFORMATION IN A DATABASE," filed Apr. 5, 2007, which claims priority to claims priority to U.S. Provisional Patent Application No. 60/789,362, entitled "SYSTEM AND METHOD FOR COLLECTING AND MANAGING PRODUCT INFORMATION IN A DATABASE", filed on Apr. 5, 2006, which is incorporated herein by reference.

BACKGROUND

Field of the Invention

The invention relates to databases, and in particular using the database to manage communications between consumers and suppliers of products.

Description of the Related Technology

In spite of the many advances of the Information Revolution, the vast majority of modern commerce remains largely unchanged in regard to buyer-vendor visibility. The lack of transparency into one another's intentions or operating details forces the parties to base decisions on assumptions or incomplete information. Although widely accepted, this absence of real-time access to information leads to enormous inefficiencies throughout the economy. Consumers pay higher prices and get less than optimal products. Producers build, stock and ship products based on imprecise projections. Advertisers spend enormous sums on media with little ability to measure results. All parties suffer greatly from the lack of a system that offers bi-directional transparency between the supply and demand elements of the economy.

SUMMARY OF CERTAIN INVENTIVE ASPECTS

One aspect is a networked database management system having access by consumers and providers, the system including a database, including user data for at least one user, the user data including profile information, one or more user interests, and an access control list. The system also includes a matching service configured to selectively allow access to the database by at least one other user of the system based on the access control list and to identify user interests that can be satisfied by an inventory of products.

Another aspect is a networked database access system for a provider, the system including a communication module configured to access data from a database. The database includes user data including profile information for the user, one or more interests of the user, and an access control list. The access of the communication module to the database data is granted based at least in part on the provider being identified in the access control list. The system also includes a product database including information related to the one or more interests of the user, and a matching service configured to select information from the product database based at least in part on the user data, where the communication module is further configured to send the selected information to the user.

Another aspect is a user communication device, including a data upload module configured to communicate user data including at least one of profile information for the user, one or more interests of the user, and an access control list to a networked database management system. The system includes a matching service configured to selectively allow access to the user data by at least one other user of the system based on the access control list and to identify user interests that can be satisfied by an inventory of products, a communication module configured to receive information selected by the system based at least in part on the user data, and an interface module configured to present the information to the user.

Another aspect is a computer readable medium, including instructions, which, when executed cause the computer to perform a method. The method includes communicating user data including at least one of profile information for the user, one or more interests of the user, and an access control list to a networked database management system, the system including a matching service configured to selectively allow access to the user data by at least one other user of the system based on the access control list and to identify user interests that can be satisfied by an inventory of products, receiving information selected by the system based at least in part on the user data, and presenting the information to the user.

BRIEF DESCRIPTION OF THE DRAWINGS

FIG. 3 is a graphical representation of the user data.

DETAILED DESCRIPTION OF CERTAIN INVENTIVE EMBODIMENTS

Figure 1:
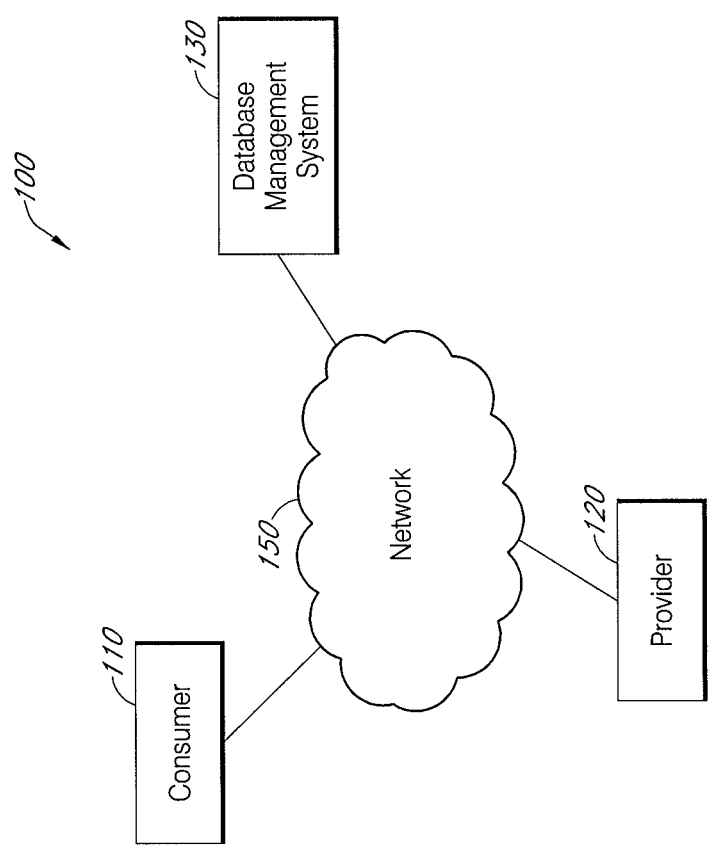
FIG. 1 is a block diagram of a database system for managing communications between a customer, provider, and a database via a network.

The following detailed description of certain embodiments presents various descriptions of specific embodiments of the invention. However, the invention can be embodied in a multitude of different ways.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Certain inventive aspects seek to empower the consumer with the means to conveniently survey a global marketplace for all providers of a given product and quickly compare the relevant terms associated with a transaction. Such insight would provide consumers with the peace-of-mind that they will always get the best deal available for their individual requirements. Likewise, this invention has the potential of providing manufacturers and retailers with insight into actual consumer buying patterns and purchase intentions. Such information would offer a number of benefits. Not only could production and supply chains operate at higher efficiencies but the product configuration and terms could be adjusted in real-time based upon the consumer profile and market conditions.

These benefits are made possible by a software system linked to a very robust database. The database stores highly detailed personal demographic information as well as an archive of past transactions and a list of wishes or planned future purchases. Statistical analysis routines would be able to accurately predict product demand and market developments. The database is maintained in a number of ways. Merchants, credit card firms and banks will be provided a means of securely exporting their client's transaction information to his personal product account. In addition, consumers may use specially configured mobile devices to scan products of interest encountered in the course of a normal day and have that information automatically stored in their personal product account. Lastly, consumers can logon to their account with a personal computer and select from product listings to either indicate items that they currently own or plan to purchase at a later date.

The dramatically improved clarity for both buyer and seller opens the door to opportunities not presently possible. For example, a consumer with a special cell phone might automatically transmit an "economic status code" that nearby retail stores would receive. If a certain store has an item in stock that is also on the consumer's wish list, a custom offer might be generated to entice the consumer to stop and buy that item immediately. Another example might be a woman who has registered her entire wardrobe in her personal account. Retailers could send her offers for clothing items that are either on her wish list or that fill a gap in her wardrobe as determined by an expert. This type of advertising differs dramatically from the conventional type in that the messages being sent correspond to actual wants or needs rather than a generic message to the marketplace. The invention incorporates a sophisticated accounting mechanism for targeting custom marketing messages that correspond to a user's account and charging advertisers varying fees depending upon the degree of interaction the user chooses to engage in. The user might get one credit for viewing the ad, five credits for responding to a query and ten percent off if they purchase by the end of the day.

The invention provides the opportunity for dramatically improved buyer-seller communications coupled with varying degrees of incentives. It would be possible to create a fully automated system for negotiating acceptable terms of a transaction by comparing the consumer's profile data/ preferences with the commercial parameters defined by a vendor. For example, Nordstroms might indicate that a consumer that averages $500 per month in clothing purchases automatically qualifies for a ten percent discount on all purchases. Another aspect is an auto dealership might adjust the terms of sale to those requested in a user profile if the desired vehicle is currently in surplus.

The analysis module of the software system can be configured to automatically survey the market for one or more items. When a good deal is found, the consumer can be alerted as to exactly where to get the best deal. Alternately, the system might suggest that this week it is better to buy groceries at Ralphs or buy gasoline at the Chevron on Main street.

Embodiments of a database management system can be used to manage communication between the users of the system, for example, a consumer and one or more suppliers. The database management system can receive and record input from and actions taken by the consumer. The database management system may, based on the recorded data, allow access to the consumer data by various product and service providers. Such access can be allowed only to those suppliers which, based on the recorded data, are likely to meet the needs and wants of the consumer. Thus, the consumer receives information fitting the consumers' specific needs and wants, and the product and service suppliers may generate communications only for consumers with needs and wants which they may satisfy.

Accordingly, consumers are able to conveniently collect information on products in which they are interested when and where they may be (e.g. in stores, at a friend's house, at home, etc). For example, a cell phone might be equipped to scan a product code and transmit it to a service bureau containing a user's personal account. The information about the product it is processed and sorted into the categories suited for that product. The user can easily rearrange the products later and make their own categories.

Users are provided several alternatives for logging on to their personal account to manage the information. In some embodiments, products like groceries and other items of certain categories are already sorted. Because the system contains pictures and detailed information about the products, the user can monitor the products as they change, for example in price and/or availability.

As long as the consumer has access to the database storing the information, they can review, compare and gather other valuable information about the products they have selected. Such information might be, for example: what the product costs at different web sites/stores or if the same item might be on sale. The user can be notified of changes of the information for particular items of interest. For example, if a consumer finds a great looking red sweater at store x. Scanning the product code with a mobile device forwards the product detail such as manufacturer, style name, size, color, etc. to the service bureau. Later, sitting in front of a computer at home, the user's account might present additional information such as what the sweater is made of, what it looks like, where it comes from, and pricing and/or availability for various venues. For example, the consumer can see that store x sells the sweater for 40 dollars but in the desired color but the manufacturer's homepage sells the red sweater for 45 dollars including shipping.

The user may choose to purchase the product using the online system or choose an alert service provided by the system where the user is contacted if certain pre-defined conditions are met. For example, if the sweater suddenly goes on sale at store x, the user would automatically be notified by e-mail or text message. The system allows shoppers to enjoy the benefits of regular shopping while at the same time, feeling confident of getting the best deal without having to invest endless hours of research or comparison shopping.

Another aspect of the system is a list making service. For example a consumer enters information on food and or household products in a store, or at home. Anything with a product code can be easily submitted to the system. Using their personal account on the service, they can make regular shopping lists, wish lists or suggestions for items to complete a project.

The shopping list can be used in a walk-in store or may be used for online ordering and food delivery. The list may be automatically sent to a provider, such as a food delivery service or a local shopping market for pick up. The shopping list, or wish list can include any item the consumer can find, and is not limited to items available through a specific source. In some embodiments, the wish list may include less specific information on a product, such as a general description of the product or function of the product. For example, a wish list may include an item such as "blue dress shoes," or "portable CD player." Furthermore, lists can be made available to other users of the system. For example, friends and relatives may select or purchase gifts using the system.

The system can also be used as an inventory status management system for home, office or anywhere else where monitoring of inventory is desired.

As an example of a typical user, the following describes how Jane Doe experiences one embodiment of the system.
1. Jane enters a website address on her computer.
   a. Registering as a user
      i. Create a profile by entering personal profile information:
         1. Name: Jane Doe
         2. Username: *joyous-jane*
         3. Measurements: Length: 170 cm, Waist: 70 cm
         4. Interests: soccer, party
         5. Favorite season: Summer
         6. Favorite colors: black, blue and green
         7. Style: punk/rock
         8. Age: 20
         9. E-mail: ..janedoe@hotmail.com..
      ii. Anything that could affect her choice of style may be entered, some things are obligatory and many are not. It is not necessary, for example, for Jane to enter answers to everything because the software will figure out Jane's actual style by analyzing her selected products, the products she has in her account, what products she studies while searching in order to be inspired, and what products she has in her inventory.
2. Services available to members:
   a. Communicate with other users
      i. Send messages
      ii. Chat in numerous different chat rooms
      iii. Share info with friend users only or let the "public" see what you got.
   b. List products currently in user's possession:
      1. enter clothes that you already have, clothes you would like to purchase or just find nice
      2.
      ii. Advanced search for fashion
         1. anything on the market should be available for the user
         2. set criteria for the product
            a. price: $100-200
            b. fabric: cotton
            c. color: white
            d. type: t-shirt
            e. size: 3
         3. let search go by user profile
         4. When finding something to match product x, system determines potential matches that conform to the user's profile.
      iii. Different alternatives for shopping
         1. order from this website
         2. link to manufacturers site
         3. see local stores that offer the product The system collects product interest information from the consumer and product information from various suppliers and purchasing outlets, and stores the information on a server, where it manages the lists for the personal account of the consumer.

In some embodiments hand-held devices may be equipped with software and/or hardware for scanning and otherwise entering information regarding interesting products. (e.g. barcode, dot code, magnetic, RFID). The consumer may scan a product and may then be prompted by the software to answer questions about the product information desired, for example its nature and purpose. Once complete, the information is transmitted from the handheld device to a database management system.

In order to manage her lists, the user can log on to her personal account on the service database management system, and use various functions and added value services. Some examples include: a) creating a wish list for an upcoming birthday; a list of grocery items needed on next shopping trip; items to add to her wardrobe.

The system will offer her a number of value-added services based on her personal lists, such as: a alert service to notify her when a clothing item goes on sale at a particular store; which grocery store would result in the lowest bill given the current items needed and manufacturer coupons now relevant for the items; notification of new products in areas of previous purchase/interest.

A service for building personal lists on a database management system in order to simplify shopping is provided. Another aspect is an electronic communication device configured to enter product information is one of several methods to enter product information to the database management system. For example, a communication device may have a scanner capable of reading product codes (barcode, RFID, pattern). Other data entry mechanisms may also be used. The device transfers the codes to a personal account of the consumer in the database management system where the codes are cross-referenced to a table containing all the relevant details of a given product. The system can compare an access control list for the personal account of the consumer to determine from what sources to receive information related to the consumer's interests. The system contacts the various information sources on the consumer's access control list. One or more of the information sources delivers information to the database management system. The consumer can then gather valuable information from their personal account about the products they themselves entered into the system. The information may include, for example, price, size, a picture, ordering information, etc. As information for each individual product changes the website is updated. The personal account is capable of notifying a user in various ways when product information changes (for example: product x goes on sale notification might be accomplished via e-mail, text message, or popup during session on the personal account). Additionally, users are provided with tools for organizing their product information in different categories or assigning rules for how the system should manage the information. For example, products may be first sorted by the database into bigger groups according to their line of use such as, groceries, clothing electronics, furniture etc. The database sorts them by reading the product information. Users also have the option of creating their own categories. Possible categories designed by the user include, for example, desire level (e.g. need, planned purchase, wish list, budget, gifts etc.). Furthermore, users are provided with an option of sharing selected information with other users. For example the category "wish list" may be shared with friends, family or with selected producer/vendors. Lastly, there may be an option for ordering/purchasing products from the companies that sell the product or service.

Devices used for scanning may be devices such as cell phones, PDAs, small scanners that fit key chains, iPods, watches, detachable scanners (scanners that are detachable to other electronic devices that do not already have a scanner) etc. The scanner may be used for shopping for various products, such as groceries, hardware, furniture, clothes, entertainment, books and CDs.

The system may also provide producers and providers of the products with limited access to aggregated consumer data in order to study the information for operational decision support such as: advertising content, advertising placement, inventory changes or manufacturing changes. In all cases, information would be distributed in a manner that protects the user's privacy. Also, in some embodiments, companies can contact targeted consumers according to certain limitations presented by the system and/or by the consumer.

FIG. 1 is a block diagram of a communications system 100. The system 100, as shown, comprises a consumer 110, a provider 120, and a database management system 130 in communication with one another with a network 150.

The network 150 may comprise, for example, the internet or a mobile communications network. The network may be wired or wireless. In some embodiments, the network may be a local area network (LAN) or a wireless local area network (WLAN), for example within a shopping mall.

A consumer 110 can connect to the network 150 with a communications device, for example, a PDA, a cell phone, a computer, a portable computer, a watch, a radio, or other communication device. With the communications device, the consumer 110 transmits to the network various user data comprising profile information, one or more user interests, and access control list parameters. The user data can also include requests for information for certain products. For example, in one embodiment a consumer 110 in a department store finds a dress she likes. She may enter information about the dress such as a product identification code together with attributes that might include purpose (e.g. party gown) and category (e.g. birthday wish). In some embodiments, she may have a scanning device which may be used to scan the bar code to enter the information about the dress. The information is sent to the network 150. In some embodiments, the consumer 110 may quickly receive information from the network 150 about the dress. For example, she may learn that the dress is on sale or is available in her favorite color at another store. She may learn that other consumers have had good or bad experiences after purchasing the dress or using that particular retailer.

The consumer 110 can receive information about the dress using the same or a different communications device immediately or at a later time. For example, the consumer may use a cell phone to communicate to the system 100 her interest in the dress. Then, at a later time, she may use her computer at home to retrieve further information about the dress such as size and color availability, locations of retailers.

The provider 120 may be a manufacturer, retailer, advertiser, service bureau or any entity wishing to engage a consumer in a commercial relationship. In certain embodiments, the provider 120 receives a communication from the network that a consumer 110 has interests which relate to an inventory of products of the provider 120. Based at least in part on the provider 120 meeting the standards defined in the access control list of the consumer 110, the provider 120 is granted access to at least a portion of the system 100 data related to the consumer 110. Based on the data related to the consumer 110, the provider 120 selects information to send to the consumer 110. The selected information may include at least one of a specific reply to communications from the consumer 110, information for a product specified by the consumer 110, information for a product related to a product specified by the consumer 110. Other information sent to the consumer might include queries, surveys, advertisements or custom offers. The provider 120 may then send the selected information to the consumer 110 through the network 150. In some embodiments, the selected information is sent directly to the consumer 110. In other embodiments, the selected information is sent additionally or alternatively to the database management system 130.

The database management system 130 is configured to receive and store user data including user profile information, user interests, and the access control list of the consumer 110. In some embodiments, the user data also includes transaction history of the user. The database management system 130 is also configured to grant database access to other users of the database management system 130, for example provider 120. The access is granted based at least in part on the user data. For example, the other users may be granted access based at least in part on an identifier of the provider 120 being in the access control list of the consumer 110. Alternatively, the provider or its product may be granted access by conforming to certain parameters set by the user and stored in the access control list. After receiving access to the database, provider 120 may determine information for the consumer 110 based on the user profile and/or interest information of the consumer 110. In some embodiments, the selected information is transmitted to the database management system 130, which then forwards the information to the consumer 110. In other embodiments, the database management system 130 modifies or formats the information prior to sending it to the consumer 110. Such modification or formatting may be done based at least in part on rules of the database management system 130 or rules established by the consumer 110.

Figure 2:
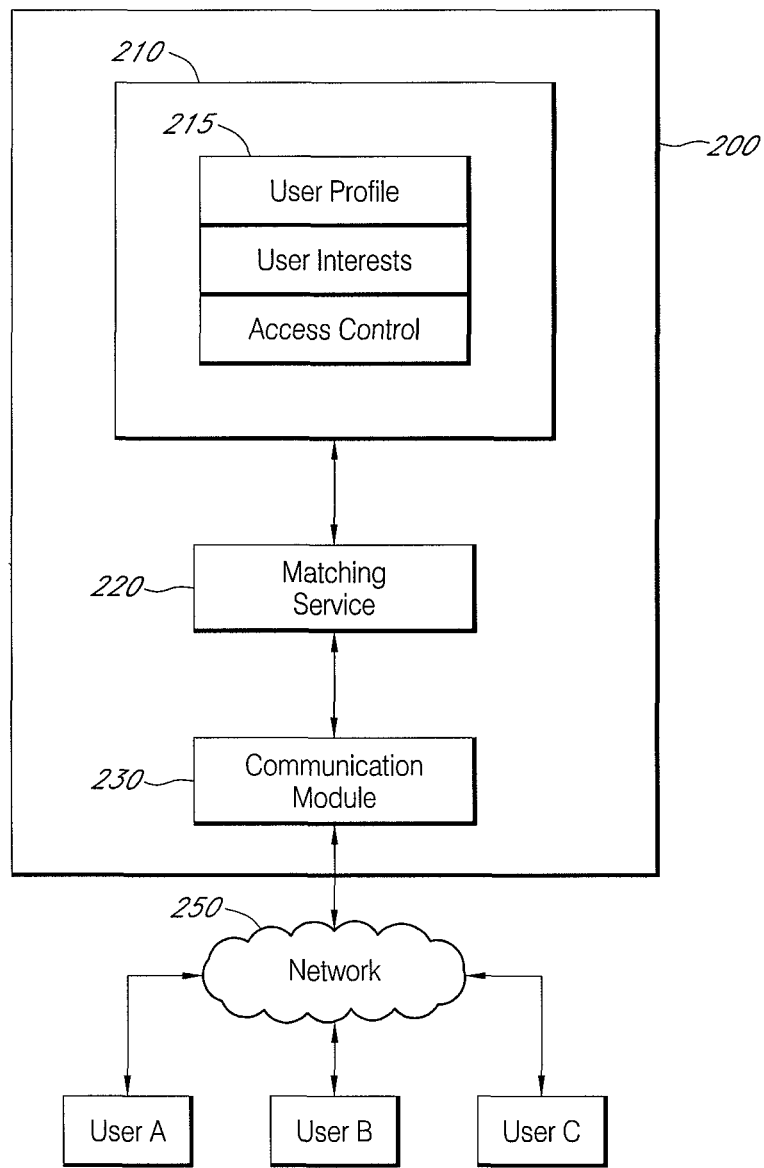
FIG. 2 shows a block diagram of an embodiment of the database management system of FIG. 1.

FIG. 2 shows a block diagram of an embodiment of a database management system 200 corresponding to the database management system 130 of FIG. 1. Also shown are network 250 and users A, B, and C. As shown, the database management system 200 and each of the users A, B, and C are connected to the network 250.

The database management system 200 comprises a database 210 with user data 215. The user data 215 comprises at least a user profile, user interests, and an access control list for each user. In some embodiments, the user data 215 may comprise a transaction history. The database management system 200 also comprises a matching service 220 configured to selectively allow access to the database 210 by another user based on the access control list and to identify user interests that can be satisfied by an inventory of products. The database management system 200 may also have a communication module 230 configured to send and receive information to and/or from each of the users A, B, and C via the network 250.

The user profile information may comprise demographic information of the user, such as age, weight, shoe size, marital status, number and ages of children, household income; contact information, such as name, phone number, address, and email address; and financial information, such as credit card balances, investments, and average neighborhood income. Other information may also be included in the user profile.

The user interests may comprise general interests, such as fashion, sports, and movies; a desired product, such as may be in a wish list; and anticipated purchases, such as jewelry, clothes, or appliances. The desired product and planned purchase may have various levels of specificity. For example one planned purchase may be a pair of Levis low-rise boot-cut blue jeans in size 3, while another may be a digital camera. The user interests may include other interests, needs, or wants of the user.

The access control list comprises a list of other users of the database management system 200 which may be granted access to the user data in the database 215. The access control list may comprise general descriptions of users, such as "grocery stores," or "sporting goods stores," and may include identifiers of specific users such as individual family members or friends. The access control list may include manufacturers, vendors, or providers of goods or services of interest to the user. In some embodiments, the access control list might contain a range of parameters with which to filter interested parties. For example, the parameters might allow only retailers who carry products currently on the wish list and who are willing to provide discounts of at least 10 percent.

The matching service 220 performs a function of determining which of the users of the system may have access to the user data. The matching service 220 does this by comparing the user data to data associated with each of the other users of the system. The matching service 220 determines, for example, based on the user data that User A, a consumer, would like information on an Adidas Official World Cup 2006 Soccer Ball. The matching service 220 searches the other users of the system for providers which can provide the information. In some embodiments, the matching service 220 selects other users which have an inventory of products which includes an Adidas Official World Cup 2006 Soccer Ball, and which are referenced, either directly or indirectly, in the access control list.

The matching service 220 may then provide access to one or more of the other users to some or all of the user data of User A. Based on the accessed data the other users may determine to send information to User A. In some embodiments, the information is sent directly to User A based on data in the user profile of User A. The information may include location and availability information, pricing, delivery options, discount information, warrantee information and specification information, such as weight and materials used. In some embodiments, the information is sent to the database management system 200, which forwards the information to User A according to rules defined in the user data 215. In some embodiments, the matching service 220 allows several other users access to some or all of the user data of User A, and several of the other users send information for User A. In some embodiments, the matching service 220 limits the number of other users whose information is sent to User A. For example, if ten providers give information about an Adidas Official World Cup 2006 Soccer Ball, the matching service 220 may limit the number of providers to less than about five providers, less than four providers, less than three providers, or to a single provider. The selected providers may be selected based on at least one of user data, rules set up by User A, and rules set up by the database management system 200. For example, User A may have required immediate availability in their user interests, and a preference that the ball must be available within 10 miles of his home. The matching service 220 may select the information for 3 stores within ten miles of the User's home selling the ball. The information may also include prices and colors currently available in each of the stores. The database management system 200 uses the communication module 230 to receive information from providers and send the information to User A.

Similarly, in some embodiments, the matching service 220 limits the number of products whose information is sent to User A. For example, if other users give information about 10 products, the matching service 220 may limit the number of products to less than about five products, less than four products, less than three products, or to a single product. The selected products may be selected based on at least one of user data, rules set up by User A, and rules set up by the database management system 200. For example, User A may have required immediate availability in their user interests, and a preference that the product must be available within 10 miles of his home. The matching service 220 may select the information for 3 stores within ten miles of the User's home selling the product. The information may also include prices and colors currently available in each of the stores.

In some embodiments, the information about the providers and products includes competing offers from the providers. The matching service 220 may facilitate automated negotiations or other form of arbitrage to narrow the number of offers to only the best terms and specifications outlined in the user data 215. This functionality enables providers to bid against each other for the business of a consumer based upon real-time, contextual factors such as: the economic status of the consumer, consumer transaction history, market supply and demand, inventory levels, or the terms of competing offers, etc. The consumer can choose among the offers for which best meets their needs and desires.

In some embodiments, the information about the providers and products includes an alert indicating that a product meets certain criteria for notifying the consumer. The criteria may include conditions on location, price, availability, and inventory status. For example, while in a shopping mall, because the database includes a leather coat as a desired purchase, and a nearby store has leather coats on sale, the consumer receives an advertisement from the store indicating that leather coats are on sale at the store.

The database management system 200 may also comprise an evaluation service, configured to generate an evaluation for the consumer based at least in part on the user data. Advertisers are willing to pay for the opportunity to send the information to the consumer. Advertisers are willing to pay more for the opportunity to send information to consumers with higher evaluations. For example, a consumer whose user data indicates that he regularly spends more than $500 each month on clothes would be very valuable to sellers of clothes. In some embodiments, the evaluation system can monitor and evaluate the consumer based on his rate of buying the products for which he has received advertisements and/or based on his rate of asking for further information related to a product. In some embodiments, the information sent to the consumer can be determined based at least in part on the evaluation of the consumer. For example, if a consumer has repeatedly asked for information related to a variety of products, but has not purchased, he may have a relatively low evaluation. The information sent to that consumer may be directed to lower cost products. In some embodiments, the charges calculated for the other users, who receive access to the user data of the consumer may be calculated based at least in part on the evaluation of the consumer.

FIG. 3 shows a graphical representation of the user data. The profile data includes the "Personal Profile" information—ID number, residence zip code, age, income, number of family members, outstanding debt, and average monthly spending as examples. The user interests include a watch and an automobile in a "wish list," a water heater in a "planning to purchase in less than 30 days" list, and a home refinance in a "planning to purchase within 12 months" list. In this embodiment, the user data also includes historical information related to grocery and gasoline purchases as provided by the grocery company's membership system and the credit card clearing service that handles fuel purchases. In some embodiments, the user data may additionally or alternatively include an inventory of possessions of User A of FIG. 2, for example information on a current wardrobe inventory.

Figure 4A:
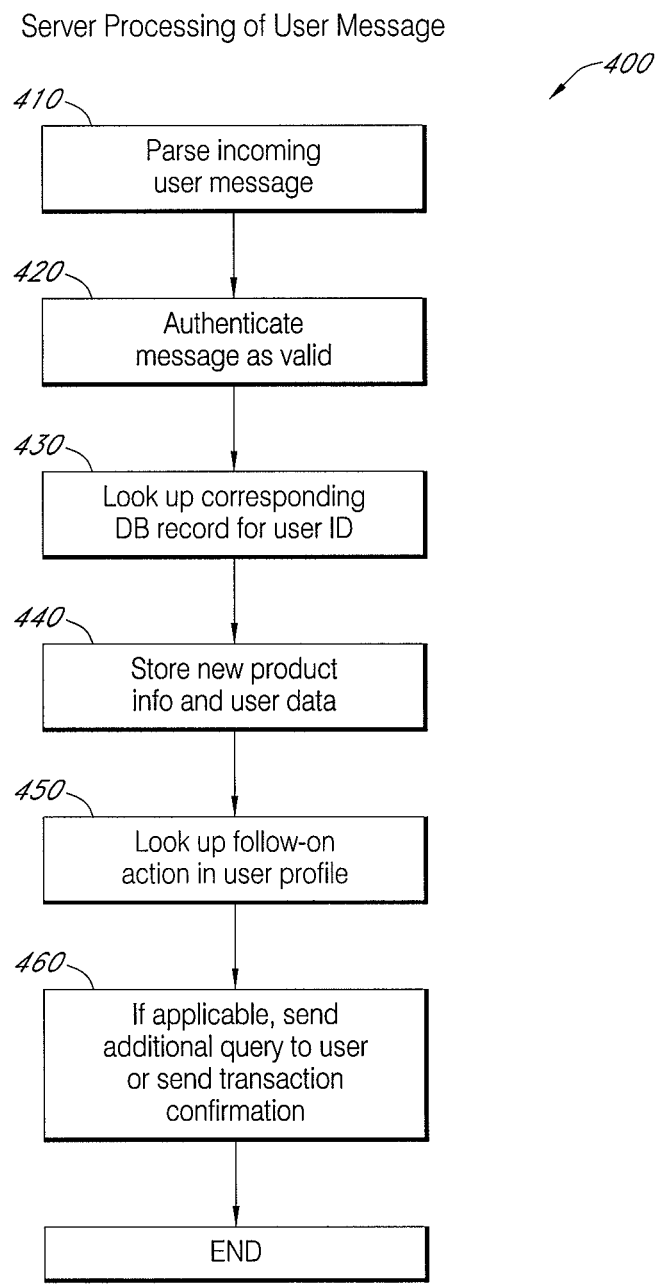
FIG. 4A is a flowchart of a method of processing input from a user.

FIG. 4A shows a method 400 of processing input from a user from a computer or mobile device. The method 400 includes step 410 where the incoming message from the user is parsed. In one embodiment, the message would be formatted using Extensible Markup Language (XML). Next, the message is authenticated in step 420. The authentication process verifies the source of the retrieved information. The authentication process confirms that the received data is unchanged from what the source transmitted and it also confirms the identity of the source. In some embodiments, the sender uses a one-way hash function to generate a digital signature from the transmitted data. The sender then encrypts the hash-code with a private key. The receiver (e.g. the server based system 200) then recalculates the digital signature from the data and decrypts the received digital signature with the sender's public key. If the two digital signatures are equal, the receiver can be confident that data has not been corrupted and that it came from the given sender. Then, in step 430 the database record for the user is accessed. The database might be a table in Microsoft SQL Server, Oracle or any relational database system. The method the goes to step 440, where the new user data is stored in a new record in the database table of the user. Then, in step 450 a response action, if any, is determined based upon parameters or script stored in the user profile. The rules or script may be expressed as XML syntax, JavaScript or VBscript as examples. Next, in step 460 an additional query or a transaction confirmation may be sent to the user. For example, the service bureau operating the database 130 may send a query to a user in response to a scanned product code requesting classification of how to store/sort the product information.

Figure 4B:
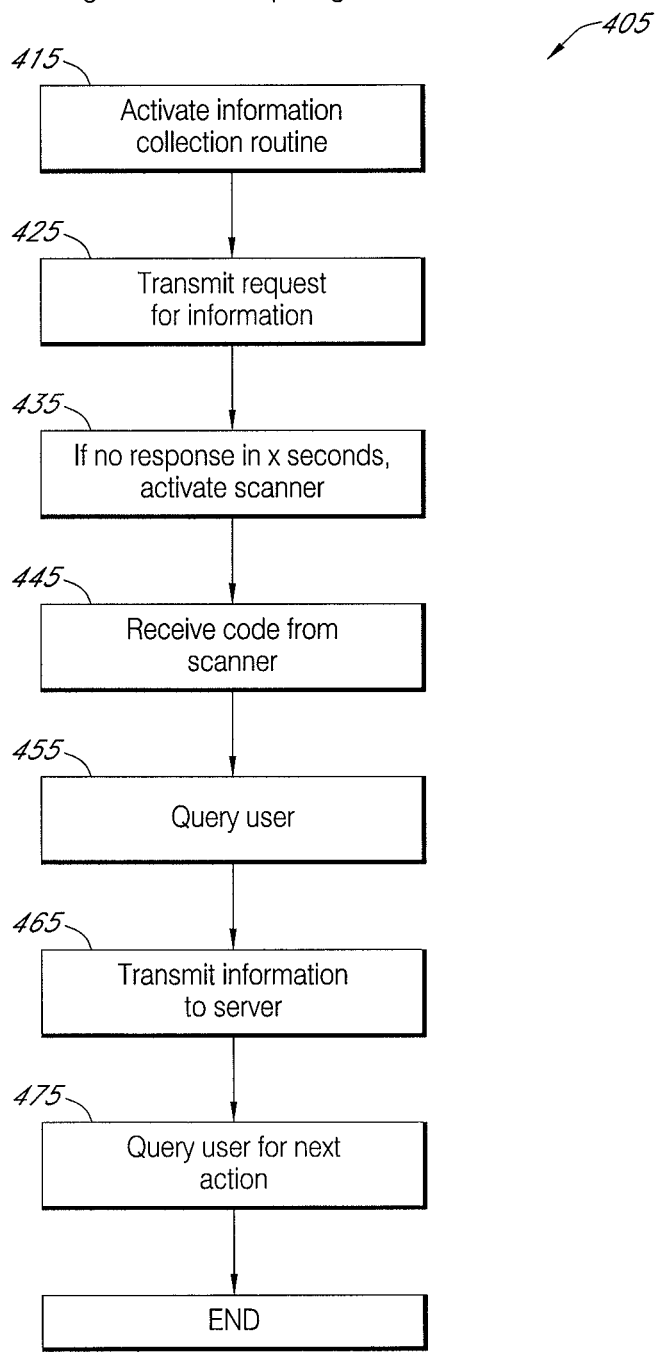
FIG. 4B is a flowchart of a method of collecting information from the user.

FIG. 4B shows a method 405 of collecting information about a product. Starting in step 415, an information collection routine is activated. Then, a request for information is transmitted to data collection device in step 425. For example, the service bureau might send a message to User A's cell phone to "Request" product information from a product display. In some cases, the product display may be equipped with a transmitter such as RFID that is capable of communicating a product code from a considerable distance. If no transmission is received, it is assumed that alternate scanning means is required in the following step. Next, in step 435, if no response is received after a period of time, the scanner is activated, and a code is received from the scanner in step 445. Then, in step 455, the user is queried as to any of a number of questions pertaining to how the product information should be used or stored on the user's database.

All server to device communications might be conducted using XML over a TCPIP connection. Next, the information in response to the query is transmitted to the server in step 465. Then, the system queries the user for another action in step 475.

Figure 5:
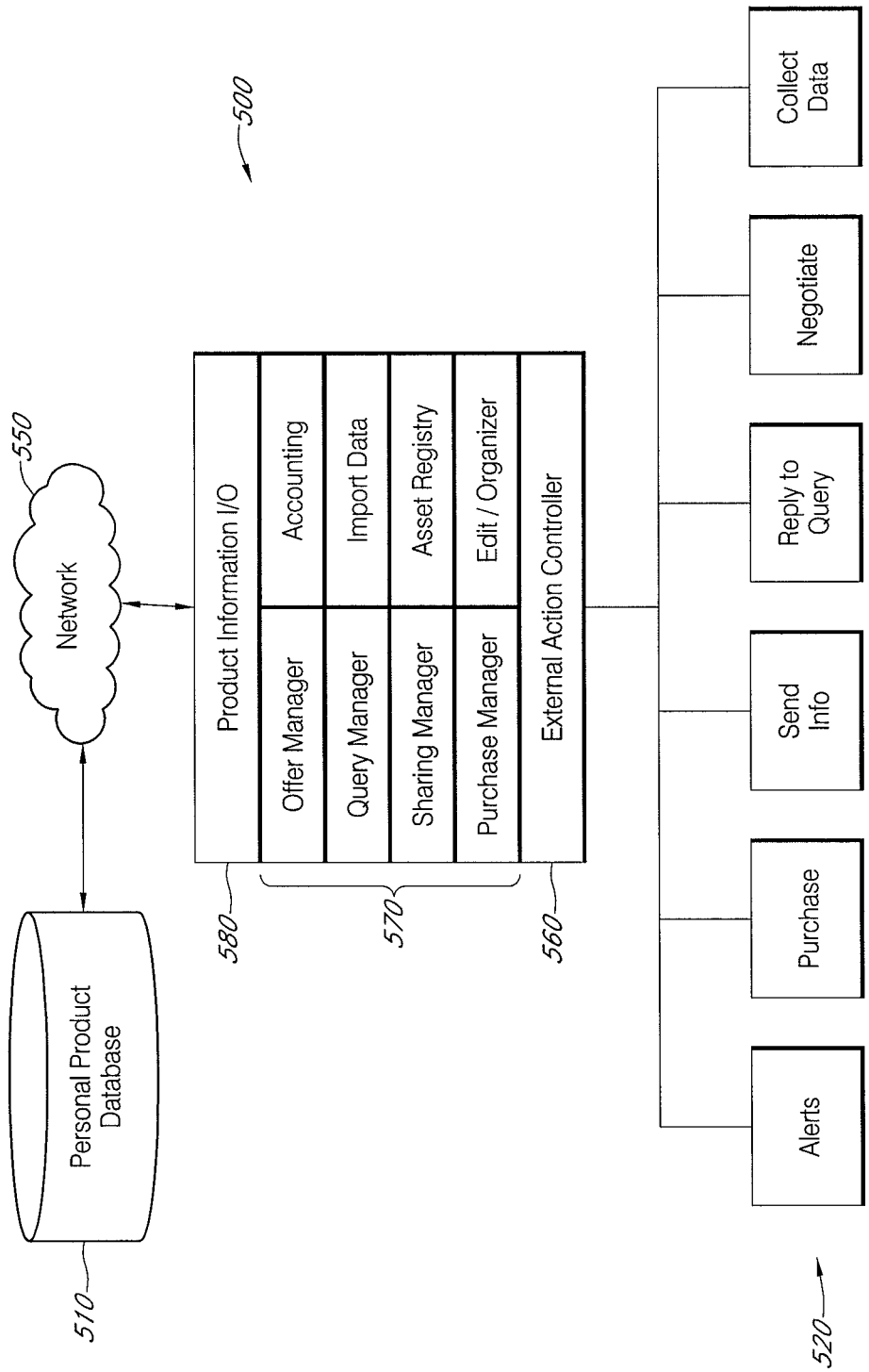
FIG. 5 is a block diagram showing that the user data may be used by various components of the database management system to generate various actions.

FIG. 5 is a block diagram showing that the user data may be used by various components of the database management system to generate various actions. The Personal Product Database 510 stores the details of all historical and future product transactions for each user of the system. Historical transactions of the user conducted through merchants or financial service firms may be imported to the system in a manner that insures data accuracy such as the use of a mapping table. The system may perform a lookup function to retrieve product details from a remote system that corresponds to UPC or comparable product codes. In addition, providers may submit detailed product specifications for their respective inventory of products that conform to predefined templates that enable the system to properly index and organize products' features and attributes. The system conducts a matching service between user records and provider records stored in the database. The actions 520 may be any of a large number of actions. In the embodiment shown in FIG. 5, the external actions 520 include at least one of the following: a) generating an alert to inform a user that a pre-defined condition has been satisfied by one or more providers; b) executing a purchase by sending transaction data to a remote system; c) sending information such as forwarding a wish list to the user's relative; d) replying to a query where a provider may have asked if the user would purchase a product if a certain configuration could be made available at a future date; e) negotiating might involve the submission of user terms to a provider system in order to open an automated bidding process intended to find the most suitable supplier of a product; and f) collecting data which might involve a series of automated login processes that permits this system to access remote systems that store the user's transaction, purchase or banking histories for transfer and storage on the current system. Other actions may also be performed.

The user system manager 500 is configured to process data from the user data in order to generate one or more actions. The user system manager 500 can include various modules, such as an external action controller 560, configured to execute external actions, various management modules 570 configured to process the user data to determine the one or more actions to be executed, and a data communication module 580 configured to receive information from the database 510 via network 550.

In some embodiments, the database 510 is local to the user system manager 500. Accordingly, the network 550 may be wired or wireless. The data communication module 580 is configured to communicate with the database 510 in order to access information from the database 510 and to store information in the database 510.

The processing modules 570 in the embodiment shown include the following: a) an Offer Manager that stores user preferences and organizes vendor offers so as to present advertisements and proposals as organized responses to user defined interests; b) a Query Manager that stores user preferences and organizes vendor queries so as to present information as organized communications to user defined interests; c) a Sharing Manager that stores user preferences and organizes potential recipients of user data according to the access control list; d) a Purchase Manager that stores user preferences and organizes vendor purchases as organized transactions to user defined interests; e) an Accounting module that tallies debits and credits associated with user actions in the system; f) an Import Data module that stores user preferences and organizes potential suppliers of user transaction data according to the access control list; g) an Asset Registry that permits users to enter products in their possession or select from a list of products that best match an asset currently owned by the user; and h) an Editor that permits the user to modify his account information.

The Offer Manager is configured to compare user data to incoming offers presented by one or more vendors or service providers. For example, electronics retailers may contract with the service bureau to evaluate the demographic and user preferences of the system members that share desirable buyer attributes. In this example, the retailers may be looking for buyers between the ages of 15 and 25, have average monthly spending of more than $300, and have a music playback device on their wish list. The service bureau provides the retailers with the means to send an offer to the users. In some cases the Offer Manager will automatically engage the retailer's system in a negotiation to either modify the offer to be more in alignment with the user preferences or to pit several retailers against one another in arbitrage. The next time a user in the selected group views their account, the winning offer(s) would appear in one or more lists/categories designated by the user. The user would then have the option of viewing the offer and accepting or requesting different terms. In this example the user does accept the offer from retailer A. The Purchase Manager of 570 would then debit the user the stated amount of money and send a transaction confirmation to retailer A with a unique code representing the specific user and terms agreed upon. The Purchase Manager may then print out a statement outlining the terms of the transaction and a machine readable code that would enable a local store of retailer A to honor the online offer and deliver the product to the buyer. In other cases, the Purchase Manager may send the transaction details to the External Action Controller 560 in order to connect to a remote system to complete a Purchase Action 520. The account for retailer A may then be debited a service fee for facilitating the transaction. In addition, the Purchase Manager forwards the details of the product and the transaction to the transaction history and Asset Registry 570.

In other embodiments, the Offer Manager may be used to generate offers from the user to be sent to providers such as in a bidding system. For example, the user data may include information indicating that the consumer would like to purchase an mp3 player. In some embodiments, the user data also indicates that certain features are required and that certain features are preferable. The Offer Manager is configured to determine which vendors on the user's access control list sell mp3 players. In some embodiments, the Offer Manager may also determine which vendors sell mp3 players having the required features. The system selects one or more vendors that best match the user preferences.

The Query Manager uses a similar process to determine, based on the user data, which providers to send or receive queries. For example, General Motors may contract with the service bureau to learn that User Group X shares common attributes: a good credit rating, employed as an independent contractor, and have a pickup truck in their planned purchases. The service bureau provides GM with the means to send the group a query as to whether an extended cab would be of interest. The next time a user in Group X views their account, the GM query would appear in one or more lists/categories designated by the user. The user would then have the option of viewing the query and responding. If the user does respond, the Accounting module of 570 may credit the user some amount of money or bonus points as reward for their response. The account for GM would then be debited a corresponding fee for the commercial value of getting direct marketplace input. In addition, the Purchase Manager tracks what and when the user does actually purchase a vehicle and stores this information as part of the user profile as a means of scoring/evaluating the user's 'performance'. In this system, performance may be determined by a number of factors such as: accuracy of answers, reliability of payment or decision time, robustness of responses, etc.

The Sharing Manager can be configured to determine which other users can have access to the user data. In some embodiments, the Sharing Manager operates by rules determined by the user and/or by the system. For example, the user may specify that provider A can access data related to electronic equipment purchases, and that provider B can access data related to clothing purchases. In another embodiment, the Sharing Manager would reveal selected portions of the user data to other web sites such as Yahoo or Google that would enable those sites to further customize the presentation of their content and or advertisements to the particulars of the user. When the user visits such sites a coded communication would authenticate the site and authorize use of the user data in addition to recording a transaction in the Accounting module to charge the web site a service fee for gaining access to the user data.

In some embodiments, the Sharing Manager allows the user to define friends or family who may have access to one or more lists maintained by the system. These lists may be a series of products or services from one or many providers. Alternatively, the list may contain a series of links that serve to create a centralized gift registry. For example, a couple engaged to be married currently registers in several retailer gift registries making it inconvenient for gift buyers to monitor the list status or get the best deal on a product. This system provides a means for efficient shopping while keeping a common gift registry updated. The Sharing Manager may also be employed by users to conduct group transactions. For example, a number of small business owners might pool their individual needs for a product into a virtual buyers block. As a result, the buyer's block might achieve a sufficient volume to qualify for terms or discount not otherwise possible for a single business. In this example, once the buyer's block reaches the minimum terms required by the vendor, the Offer Manager would forward an order/offer to one or more vendors.

The Purchase Manager can be configured to automatically purchase items from the providers under certain conditions specified by the user and/or by the system. For example, the user can specify that if the price of a certain new car drops below a certain price, a purchase order is automatically generated. In some embodiments, the specifications can include various features available, such as color, and leather seats.

The Accounting module can be used to calculate charges for the providers using the system. For example, each time a provider is granted access to the database, a charge can be generated in the account of the provider. In some embodiments, the charge calculated is based at least in part on user data, such as purchase history of the user.

The Import Data module is configured to receive user data and to place the data in the database according to the database structure. In some embodiments, historical transactions of the user conducted through merchants or financial service firms may be imported to the system in a manner that insures data accuracy such as the use of a mapping table. The system may perform a lookup function to retrieve product details from a remote system that corresponds to UPC or comparable product codes.

The Asset Registry is configured to record and organize an inventory of the user. For example the asset registry may record and access in the database a list of music the user has. In some embodiments, the system uses the user inventory to determine likely preferences of the user. For example, if the user has multiple CD's from a certain artist, when a new album from the artist becomes available, the system can send a notice to the user, or the system can send a notice to one or more CD providers, who can generate a communication for the user. In another embodiment, provider product details contained in the Product Database 510 are presented to the user in an interactive format that assists the user in identifying the specific products currently in his possession. This process is necessary to record sufficient detail about the products such that subsequent analysis and or matching may be as accurate as possible. The Asset Registry may also be configured to monitor such things as when grocery items expire, when equipment needs maintenance or recommendations on how to improve or upgrade the item.

Figure 6A:
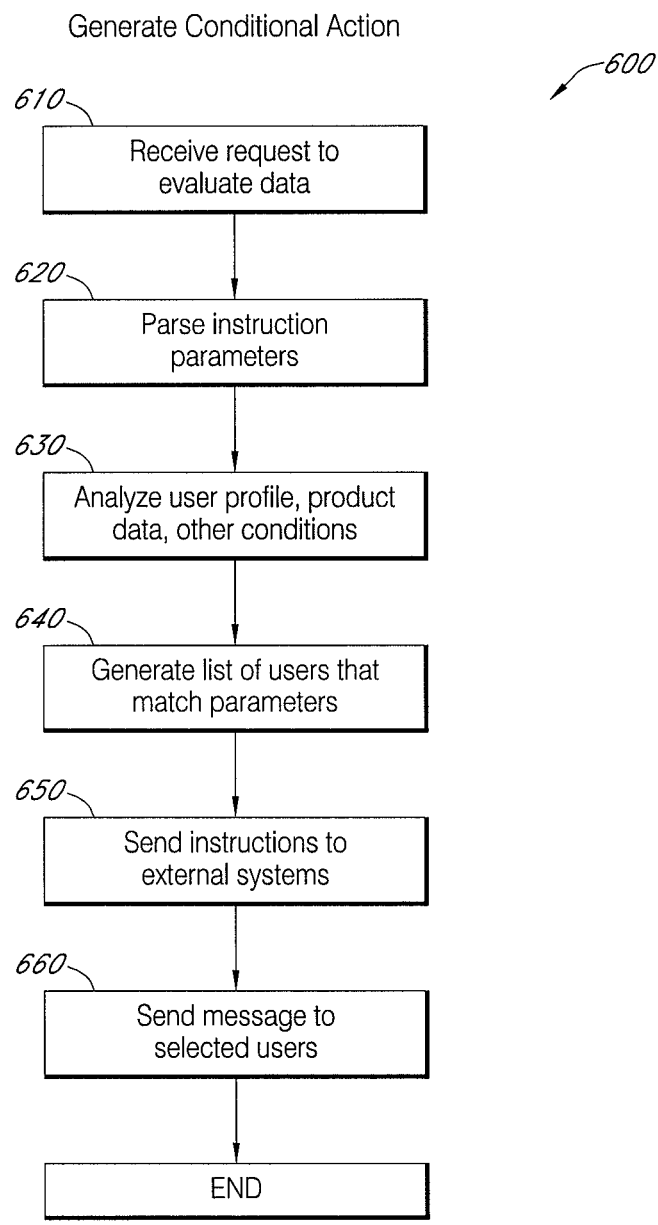
FIG. 6A is a flowchart of a method of selecting users.

Another aspect is an Edit/organizer module may be used by the user to manage the graphical appearance and organization of the information received by the user. For example, the information from various vendors may be sorted according to any of price, location, when available, and a ranking determined by the system based on user preferences. The Edit module facilitates user modification of lists, assets, offers, replies to queries, etc. FIG. 6A shows a method of selecting users that match the parameters contained in an instruction from a Provider System. The method 600, starts with step 610, where the system receives a request to evaluate user data. Then, at step 620, the system parses the request for various components, such as actions (e.g. purchase, or request information), and objects, such as the subject of the request (e.g. a car, or an mp3 player). Next, at step 630, the user data is analyzed. This may include determining which of the profile information, user interests, and access control list entries are relevant to the current request. Furthermore, the user data is analyzed to determine which providers on the access control list may meet the needs of the current request. At step 640, the system selects which vendors to contact regarding the request. For example, the request may relate to information regarding purchasing a watch. The system may determine local department stores, and online sources for watches matching the description of the watch(es) in the request. Next, at step 650 the local department stores and online providers are contacted, whereupon the stores and online providers send information to the system. Then, at step 660 one or more messages formulated based on the user data, the request, and the information received from the stores and online providers are sent to the user. In some embodiments, the information is modified by the system before being sent to the user, for example, to conform to user preferences for organization, display, method of communication, etc.

Figure 6B:
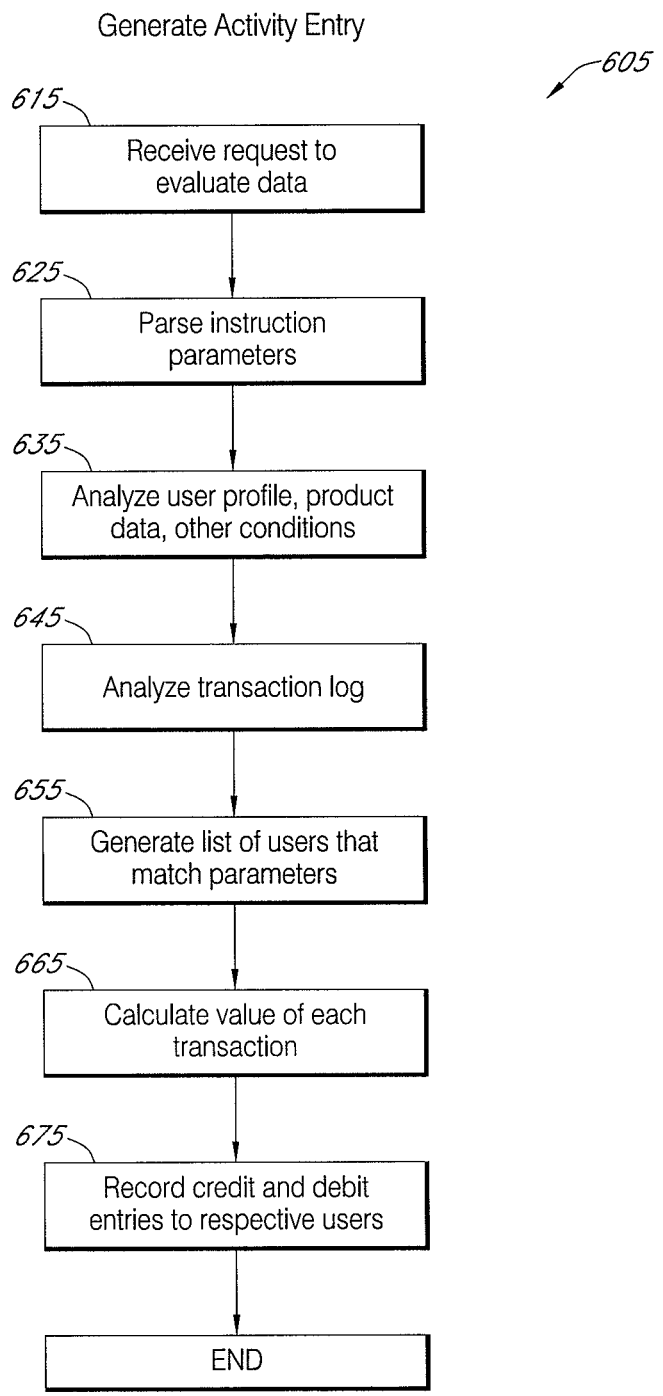
FIG. 6B is a flowchart of a method of financial accounting for the system.

FIG. 6B shows a method of financial accounting for the system. The method 605 starts with steps 615, 625, and 635, which are analogous to steps 610, 620, and 630 of FIG. 6A. At step 645 a transaction log is analyzed to evaluate the consumer for accounting purposes. For example, if more frequently than on average, the consumer purchases items for which information is requested, the charge to the providers may be higher than average. Then at step 655, the system determines which other users match the user data, such as is performed in step 640 of FIG. 6A. Based at least in part on the list of other users and on the results of the transaction log analysis, a value for each transaction is calculated in step 665. Then, at step 675, the results of the calculations are posted as debit or credit entries. In some embodiments, advertisers may desire to customize messages to consumers. In such a case the analysis service outlined above would be performed for a pre-determined fee and recorded by the accounting system for the respective advertiser and, in certain cases, credit the user with money or bonus points.

Figure 7:
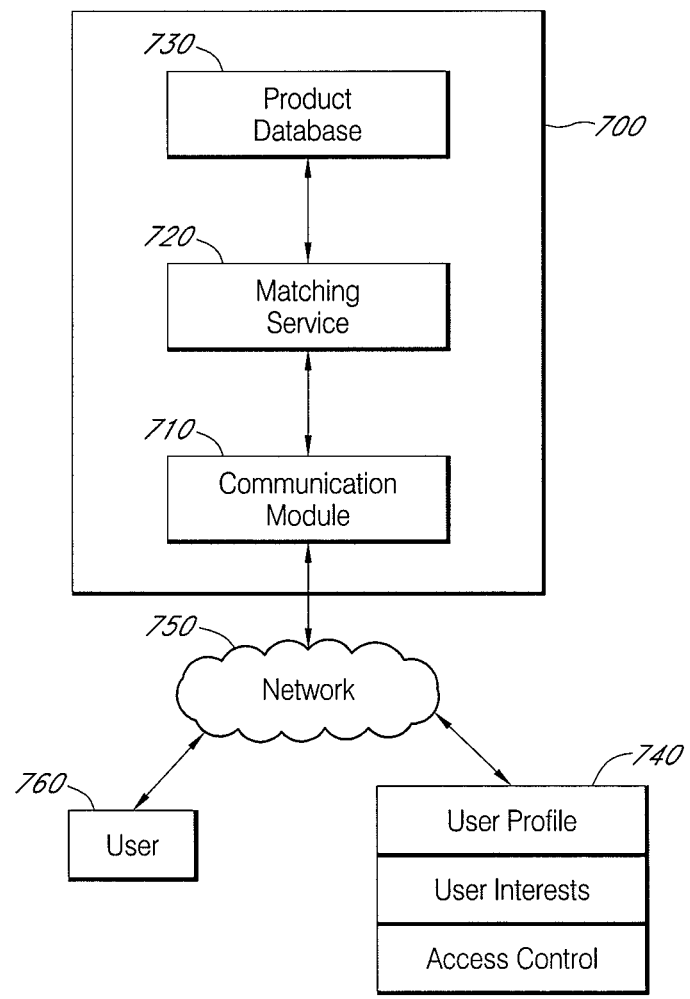
FIG. 7 is a block diagram of a database access system for a provider system, such as the provider system of FIG. 1.

FIG. 7 shows a block diagram of a database access system for a provider system 700, such as the provider system 120 of FIG. 1. The system 700 has a communication module 710 configured to access data from a database 740, which may be similar to database 210 of FIG. 2, via network 750. The communication module 710 is further configured to communicate with user 760. In some embodiments, the communication module 710 communicates directly with user 760, and in some embodiments the communication module 710 communicates with the user 760 via a database management system connected with the database 740. In some embodiments, the communication module 710 communicates the information exclusively to the user with a user system, such as user system 500 of FIG. 5.

The provider system 700 has a product database 730 of an inventory of products the provider sells. Each of the products (goods and/or services) in the inventory has various attributes in the product database 730 in sufficient detail so as to be distinguished from comparable products. For example, a cell phone record in the product database 730 may include price, availability, shipping costs, weight, color, battery life, dimensions and various unique features of the cell phone. In some embodiments, the information in the product database 730 includes at least one of an advertisement, an offer to sell, and a query. In some embodiments, the communication module 710 communicates the information exclusively to the user as an individualized message.

The provider system 700 also includes a matching service 720 configured to select information from the product database 730 based on a correlation between the attributes of the products in the product database 730 and the user data received from the database 740. In some embodiments, the matching service 720 is configured to select information based at least in part on at least one of a time, a location, a product, an inventory level, and an advertising venue. For example, the information selected may be a text message alerting the consumer that wallets are currently on sale at a nearby store. This information may have been selected for this customer because the consumer is currently in the same mall as the wallet store, the inventory in the store is relatively low and only a few generally high spending customers are being told, and this customer often responds well to text message advertisements.

In some embodiments, the information selected comprises a query, an advertisement, or an offer to sell. In some embodiments, the user may respond with his communication device to the information sent by the system. The user data may comprise a consumer response including at least one of a request for further information, such as price and availability, a comment that the consumer is not interested now, and a purchase order. In some embodiments, if the user data comprises an order for a purchase, the matching service 720 may select a confirmation of the purchase as the information sent to the consumer. For example, if the consumer chooses to buy a red shirt on sale for $27.95, a confirmation of the item purchased and the cost may be sent to the consumer. In some embodiments, the consumer's credit card may be billed by the system. In other embodiments the consumer may take the order confirmation to a local store to both pick up and pay for the shirt for the terms agreed upon in the system.

In some embodiments, the information comprises an offer to sell, where the offer is generated so as to be compared by the consumer to one or more other offers. In some embodiments, multiple sources of offers are simultaneously interacting with the consumer. Each seller modifies their offer interactively, in response to actions by the consumer, and in response to the offers of the other sellers. In some embodiments, this interactivity is performed automatically by the matching service of each of the sellers. The result is an automatic reverse auction where the consumer ultimately receives the best price and/or terms and conditions for the item. For example, three athletic shoe vendors may all have a soccer cleat which the consumer would like to buy. Initial bids from the three vendors may be $45, $50, and $52. Second bids may be $45, $48 with free delivery, and the third vendor may choose to not bid any further. Final bids may be $45 with a free pair of socks, and $48 with free delivery. The consumer may then give a signal as to which if either of the bids she would like to accept.

Figure 8:
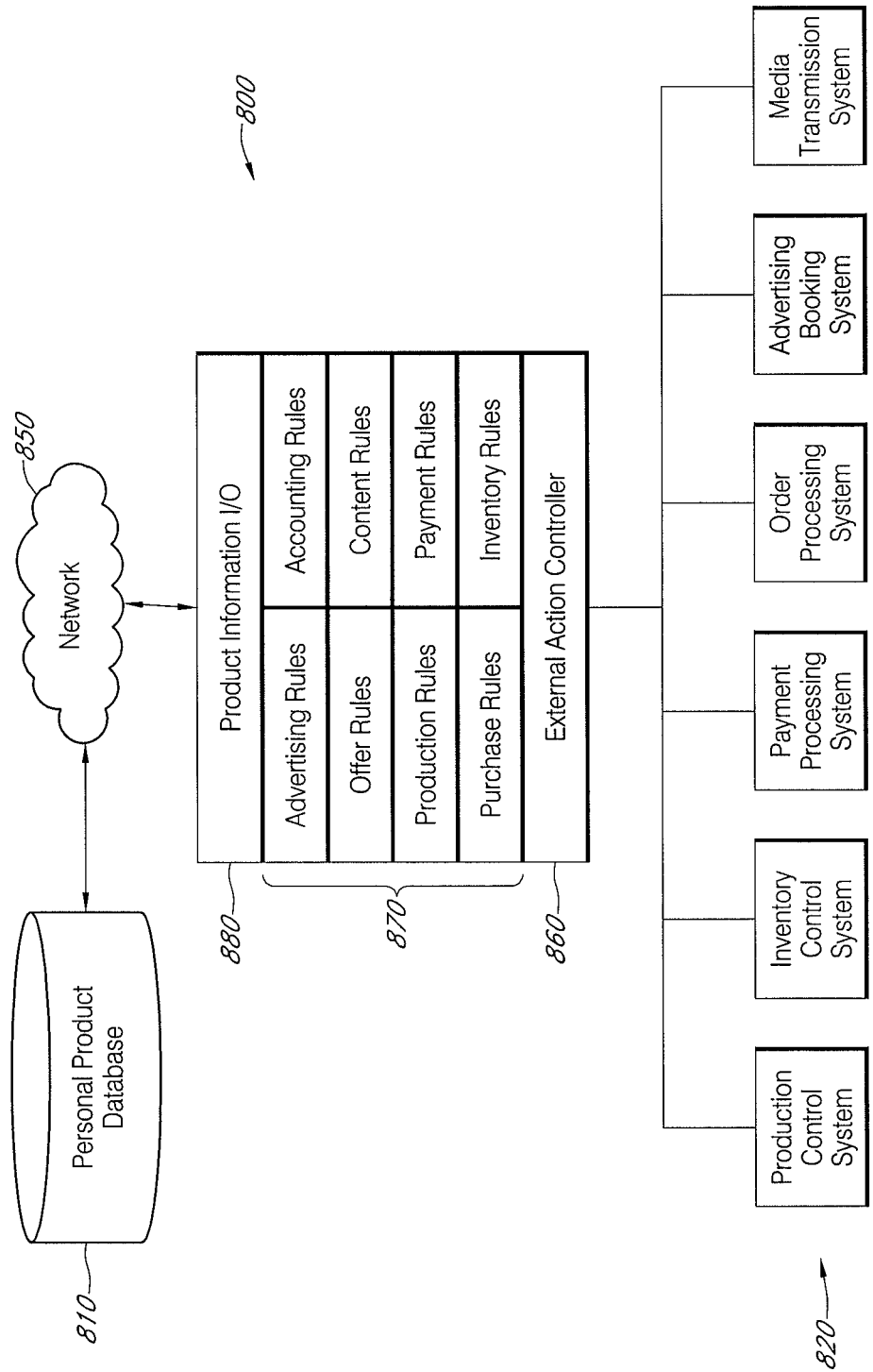
FIG. 8 is a block diagram showing that the user data may be used by various components of the provider system to generate actions for various systems.

FIG. 8 is a block diagram of a provider system showing that the user data may be used by various components of the matching service 870 to generate actions for various systems 820. The systems 820 may be any of a large number of remote systems. In the embodiment shown in FIG. 8, the systems 820 include at least one of the following: a) a production control system capable of receiving instructions to modify the production process based at least in part on user data; b) an inventory control system capable of receiving instructions to modify the logistics process based at least in part on user data; c) a payment processing system and order processing system capable of receiving instructions to modify commercial transactions based at least in part on user data; d) an advertising booking system capable of receiving instructions to modify the advertising placement process based at least in part on user data; e) and a media transmission system capable of receiving instructions to modify the content creation or media transmission based at least in part on user data. Actions for various other systems may also be generated. Another aspect is an action generator 800 is configured to process data from the user data in order to generate one or more actions. The provider system 800 can include various modules, such as an External Action Controller 860, configured to communicate instructions to external or remote systems, various processing modules of the matching service 870 configured to process the user data to determine the one or more actions to be executed, and a product information input/output module 880 configured to receive information from the database 810 via network 850.

In some embodiments, the database 810 is local to the Provider System 800. Accordingly, the network 850 may be wired or wireless. The product information input/output module 880 is configured to communicate with the database 810 in order to access information from the database 810 and to store information in the database 810.

The processing modules of the matching service 870 are configured to process the user data based on various sets of rules so as to automate commercial interaction with consumers and negotiate transactions. In the embodiment shown, the rules include advertising rules, offer rules, production rules, purchase rules, accounting rules, content rules, payment rules, and inventory rules.

The advertising rules may include minimum income requirements for the consumer, or a rule that when information of a first product is requested, in addition to the requested information, information on related products, such as accessories, is also provided. Additionally, the rules may dictate specific advertising messages should be delivered under a given set of circumstances such that consumers receive as individualized of a message as possible. The rules may further dictate external actions 820 such as booking a Google adword because consumers are showing increasing interest in a product with a unique feature.

The offer rules may include rules for accepting an offer to buy from a customer such that a minimum bid is generated based at least in part on the user data. For example, a minimum bid for a consumer which frequently purchases products sold by the provider may be lower than the minimum bid for a new customer. Similarly, offers to sell at a price may also be generated based at least in part on the user data. Additionally, the rules may dictate specific offer terms should be extended under a given set of circumstances such that consumers receive as individualized of an offer as possible.

Production rules may include conditions which affect production of products. For example if the provider experiences an increase in interest in a product, production of the product may be increased. In some embodiments, production equipment may be controlled to produce products as they are ordered or to fulfill custom design requests Similarly, purchase rules may include conditions which affect the purchase of goods and/or services needed by the provider. For example if the provider experiences an increase in interest in a product, wholesale purchases of the product or its raw materials may be increased. In some embodiments, purchase orders may be generated to purchase products as they are ordered.

Accounting rules may, for example, include rules based on policies for a credit account for the consumer. Similarly, raw materials purchases or manufacturing decisions may be ordered based on accounting rules.

Content rules may be used to determine the content of advertisements sent to the consumer. For example, consumers with user data indicating that they are likely to purchase a high-margin product may receive advertisement content related only to the high-margin products of the provider. Similarly, if a certain product is found to be popular in the zip code of the consumer, an advertisement for that product may be selected for the consumer. The rules may dictate the combination of specific advertising components to form a complete message such that consumers receive as individualized of a message as possible.

Payment rules may be used to determine payment options for the consumer. A consumer may be extended credit based on user data, such as payment history of past purchases from the provider.

Inventory rules may be used to determine need for additional production. In some embodiments, inventory rules may be used to determine pricing. For example, if inventory is below a level, the price may increase.

Figure 9:
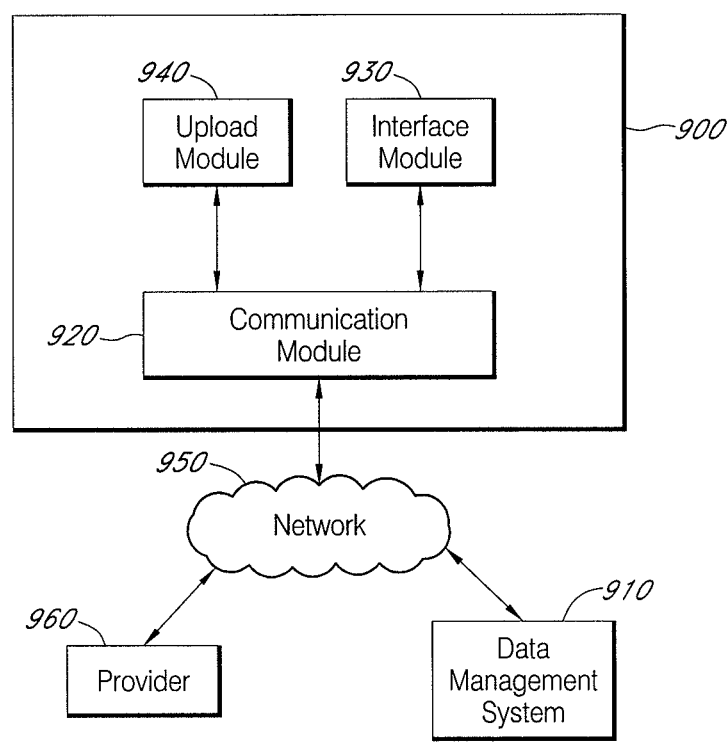
FIG. 9 is a block diagram showing a user communication device connected with a network to a database management system and to a provider.

FIG. 9 is a block diagram showing a user communication device 900 connected with a network 950 to a database management system 910 and to a provider 960. The database management system 910 may be similar to the database management system 200 of FIG. 2. The communication device is an embodiment of the consumer system 110 shown in FIG. 1. The communication device 900 comprises an upload module 940, a communication module 920, and an interface module 930.

The communication device 900 is configured to communicate user data including at least one of profile information, user preferences, product information, or access control information to the database management system 910. With the communication device 900, the user enters the data and uploads the information to the database management system 910 which stores the information in a database (not shown). In addition, the communication device 900 is configured to communicate a request for information on a product. In some embodiments, multiple communication devices are used by the same consumer. For example, a consumer may use a first communication device 900, a personal computer at home, to upload certain profile information, user interests, and access control information. Then, while shopping, the consumer may use a second communication device 900, a cell phone, to upload a user interest comprising a request for information about a product, such as a new toaster.

In some embodiments, the upload module 940 comprises a bar-code scanner (not shown) to assist in uploading product identification. Upon finding a product of interest, the consumer scans the bar code of the product. Using the communication device 900, the consumer can label the scanned product as to be included as a product of interest. In some embodiments, a level of interest can also be indicated. For example, the consumer may label the scanned product as being a planned purchase, a possible purchase, a gift purchase for someone else, and/or a subject of a request for more information, such as price, sizes, colors, seller locations, and availability, The communication device 900 also has a communication module 920 which is configured to receive data from the database management system 910 or a provider 960. The received data may, for example, comprise a report on the customer satisfaction for the cell phone. The communication module 920 is further configured to transmit the received data to the interface module 930. The interface module 930 is configured to process and display the received information to the consumer on a display. In some embodiments, the information has a format which allows the interface module 930 to present the information to the consumer according to rules established by the consumer. For example, a list of stores selling a product of interest may be sorted by distance from the consumer's current location.

In other embodiments, the consumer may simply present a unique code to make use of a proxy communication device 900 that is being operated by a third party. For example, a merchant credit card might also store the user's system access code which permits product information to be sent directly from the merchant to the data management system 910 without the user having to physically operate the communication device 900.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention.

What is claimed is:

1. A networked database management system (DBMS), comprising:
   a computer accessible data storage, comprising a database remotely located from a plurality of consumers and a plurality of merchants, wherein the remote database comprises:
   a plurality of records including user data for the plurality of consumers, each record comprising a plurality of logically separable fields for data related to one of the consumers, the plurality of fields comprising:
   user profile information of the one consumer,
   a user defined interest of the one consumer, and
   access control list data, wherein the access control list is specified by the one consumer and comprises identification information for the plurality of merchants comprising at least one of a manufacturer, a vendor, and a provider which market or sell types of products or services that are relevant to one or more user defined interests, and
   a plurality of additional records, each additional record including inventory data of one of the plurality of merchants;
   a communication module in data communication with the data storage and configured to receive user profile information and user defined interest from the one consumer for storage in the remote database; and
   a matching module in data communication with the data storage and configured to perform a search on the remote database for merchants which have inventory data matching the user defined interest of the one consumer and to selectively grant to one or more of the merchants access to the user profile information and the user defined interest of the one consumer stored in the remote database, based at least in part on the search on the remote database for the merchants which have inventory data matching the user defined interest and, for only those merchants having been found by the search, a comparison of the found merchants with the identification information of merchants in the access control list specified by the one consumer, wherein the communication and matching modules are executable by a processor.

2. The DBMS system of claim 1, wherein the user profile information comprises at least one of age, marital status, number of children, ages of children, household income, contact information, name, phone number, address, email address, financial information, credit card balances, investment information, clothing sizes, body measurements, weight, hair color, eye color, education courses, education degree, past travel destinations, hobbies, awards, vehicle make, vehicle model, and residence attributes.

3. The DBMS system of claim 1, wherein the user defined interests comprise at least one of a general interest, a desired product, and an anticipated purchase.

4. The DBMS system of claim 1, wherein the user data further comprises a consumer transaction history, and wherein the matching module is further configured to allow access based at least in part on the consumer transaction history.

5. The DBMS system of claim 1, wherein the user data further comprises an inventory of consumer possessions, and the matching module is further configured to allow access based at least in part on the inventory.

6. The DBMS system of claim 1, further comprising a charge module configured to calculate a charge to the merchant as a result of the merchant being allowed access to the remote database.

7. The DBMS system of claim 1, wherein the communication module is configured to send information to the consumer, the information being selected based at least in part on the user data.

8. The DBMS system of claim 7, wherein the selected information comprises information related to one or more products.

9. The DBMS system of claim 8, wherein the user data is sufficiently detailed that the matching module is further configured to select information related to no more than five products, the no more than five products being selected as being preferable over all other products having information accessible to the matching module.

10. The DBMS system of claim 8, wherein the one or more products are available from a plurality of merchants and the selected information comprises competing offers from the plurality of merchants.

11. The DBMS system of claim 10, wherein one or more of the competing offers is modified in response to another competing offer.

12. The DBMS system of claim 7, wherein the selected information comprises a query.

13. The DBMS system of claim 7, wherein the selected information comprises an advertisement or an offer to sell for one or more products.

14. The DBMS system of claim 7, wherein the selected information has a format which allows the selected information to be presented to the consumer according to rules defined by the consumer.

15. The DBMS system of claim 7, wherein the selected information comprises an alert based at least in part on at least one of a location, a price, an inventory, an item status.

16. The DBMS system of claim 7, further comprising an evaluation module, configured to generate an evaluation for the consumer based at least in part on the user data.

17. The DBMS system of claim 16, wherein the evaluation is based at least in part on actions taken by the consumer in response to past information received by the consumer.

18. The DBMS system of claim 16, wherein the selected information is based at least in part on the evaluation.

19. The DBMS system of claim 16, further comprising a charge module configured to calculate a charge to the merchant based at least in part on the evaluation.

20. A consumer communication device, comprising:
a data upload module configured to communicate user profile information for a consumer, one or more user defined interests of the consumer, and an access control list specified by the consumer to a networked database management system (DBMS) remotely located from the consumer and a plurality of merchants, wherein the access control list comprises identification information for the plurality of merchants comprising at least one of a manufacturer, a vendor, and a provider which market and sell types of products or services that are relevant to one or more user defined interests of the consumer, the DBMS comprising a matching module configured to selectively allow access to the user profile information and the user defined interest of the consumer by at least one merchant based at least in part on a search on the networked DBMS for merchants which have inventory data matching the one or more user defined interests and, for only those merchants having been found by the search, a comparison of the found merchants with identification information of merchants in the access control list;
a communication module configured to receive user profile information and user defined interest for storage in the networked DBMS; and
an interface module configured to present the information of the at least one merchant having been selectively allowed access to the consumer,
wherein the data upload, communication, and interface modules are executable by a processor of the consumer communication device.

21. The consumer communication device of claim 20, wherein the user defined interests comprise at least one of a desired product and an anticipated purchase.

22. The consumer communication device of claim 20, wherein the communication module is configured to communicate wirelessly.

23. The consumer communication device of claim 20, wherein the interface module comprises a display.

24. The consumer communication device of claim 20, wherein the selected information comprises information related to a product.

25. The consumer communication device of claim 20, further comprising a bar code scanner.

26. A non-transitory computer readable storage medium, comprising instructions, which, when executed cause the computer to perform a method, the method comprising:
communicating user profile information for a consumer, one or more user defined interests of the consumer, and an access control list specified by the consumer to a networked database management system (DBMS) remotely located from the consumer and a plurality of merchants, wherein the access control list comprises identification information for the plurality of merchants comprising at least one of a manufacturer, a vendor, and a provider which market and sell types of products or services that are relevant to one or more user defined interests of the consumer, the system comprising a matching service configured to selectively allow access to the user profile information and the user defined interest of the consumer by at least one merchant based at least in part on a search on the remote DBMS for merchants which have inventory data matching the one or more user defined interests and, for only those merchants having been found by the search, a comparison of the found merchants with identification information of merchants in the access control list;
receiving information of the at least one merchant having been selectively allowed access; and
presenting the information to the consumer.

27. The non-transitory computer readable storage medium of claim 26, wherein the user defined interests comprise at least one of a desired product and an anticipated purchase.

28. The non-transitory computer readable storage medium of claim 26, wherein the communication of the user profile information, the one or more user defined interests and the access control list is performed wirelessly.

29. The non-transitory computer readable storage medium of claim 26, wherein presenting the information to the consumer comprises presenting the information on a display.

30. The non-transitory computer readable storage medium of claim 26, wherein the received information comprises information related to a product.

31. The non-transitory computer readable storage medium of claim 26, wherein the method further comprises calculating a charge to the at least one merchant based at least in part on an evaluation generated for the consumer based at least in part on the accessed user data.

32. A networked database management system (DBMS), comprising:
a computer accessible data storage, comprising a database remote from a plurality of consumers and a plurality of merchants, wherein the remote database comprises:
user data for the plurality of consumers, the user data comprising:
user profile information of one of the consumers,
a plurality of user defined interests of the one consumer, and
an access control list for each user, wherein the access control list is specified by the one consumer and comprises identification information for a plurality of merchants comprising at least one of a manufacturer, a vendor, and a provider which market and sell types of products or services that are relevant to one or more user defined interests, and
inventory data of a plurality of merchants;
a communication module in data communication with the data storage and configured to receive information from the one consumer and from the plurality of merchants; and
a matching module in data communication with the data storage and configured to perform a search on the remote database for merchants which have inventory data matching at least one of the user defined interests of the one consumer and to selectivelygrant to one or more of the merchants access to the user profile information of the one consumer based at least in part on the search for merchants which have inventory data matching at least one of the user defined interests and, for only those merchants having been found by the search, a comparison of the found merchants with the identification information of merchants in the access control list specified by the one consumer, wherein the communication and matching modules are executable by a processor.

33. The DBMS system of claim 32, wherein the user data further comprises a consumer transaction history, and the matching module is further configured to allow access based at least in part on the consumer transaction history.

34. The DBMS system of claim 32, further comprising a charge module configured to calculate a charge to the merchant as a result of the merchant being allowed access to the user data.

* * * * *